United States Patent [19]

Irwin et al.

[11] 4,200,308
[45] Apr. 29, 1980

[54] LINEAR LOCKING SEAT BELT RETRACTOR

[75] Inventors: Clarence C. Irwin, Sterling Heights; David F. Manz, Bloomfield Hills, both of Mich.

[73] Assignee: General Motors Corporation, Detroit, Mich.

[21] Appl. No.: 936,797

[22] Filed: Aug. 25, 1978

[51] Int. Cl.² .............................................. B60R 21/10
[52] U.S. Cl. .................................... 280/804; 180/282; 297/480
[58] Field of Search .............................. 280/744–747; 180/103 A; 297/388, 389

[56] References Cited

U.S. PATENT DOCUMENTS

| | | | |
|---|---|---|---|
| 3,271,071 | 9/1966 | Tabor | 297/375 |
| 3,292,744 | 12/1966 | Replogle | 188/135 |
| 3,315,935 | 4/1967 | Clevett, Jr. et al. | 248/249 |
| 3,439,932 | 4/1969 | Lewis et al. | 280/150 |
| 3,535,001 | 10/1970 | Lewis et al. | 297/388 |
| 3,557,914 | 1/1971 | Tanaka | 188/134 |
| 3,610,361 | 10/1971 | Pringle | 180/82 |
| 3,645,549 | 2/1972 | Jantzen | 297/388 |
| 3,667,805 | 6/1972 | Apri | 297/385 |
| 3,770,078 | 11/1973 | Keppel | 180/111 |
| 3,865,398 | 2/1975 | Woll | 280/150 AB |
| 3,869,173 | 4/1975 | Haller et al. | 297/388 |

*Primary Examiner*—John J. Love
*Assistant Examiner*—D. W. Underwood
*Attorney, Agent, or Firm*—Charles E. Leahy

[57] ABSTRACT

Mechanism for retracting a vehicle seat belt and locking the belt against extension includes a track mounted on the vehicle body and a belt carriage mounted on the track for movement in the belt extending and retracting directions. A return spring biases the carriage in the belt retracting direction. The belt carriage has a locking knife edge engageable with a knife edge on the track to lock the belt carriage against belt extending movement when the carriage is pivoted bodily relative the track. A spring mounted on the carriage slidably bears upon the track to urge the carriage to a normal position wherein the locking edge is spaced from engagement with the track. The seat belt is attached to the carriage by a yoke which bodily pivots the carriage to engage the locking edge with the track upon attempted rapid extension of the belt.

2 Claims, 4 Drawing Figures

LINEAR LOCKING SEAT BELT RETRACTOR

The invention relates to a seat belt retractor and more particularly to a seat belt retractor wherein a belt end is moved along a linear path by a track mounted carriage having associated locking means selectively actuatable to lock the carriage and thereby prevent belt extension.

BACKGROUND OF THE INVENTION

It is well known to mount the end of a seat belt on a vehicle body via a linear belt retracting mechanism including a carriage movable on a track. The carriage is typically moved in a belt retracting direction by a spring. A lock is provided to selectively prevent belt extension and is preferably a pawl or the like mounted on the carriage and selectively actuatable to engage the track. The lock is operated by a sensing means responsive to a condition of rapid belt unwinding or a condition of vehicle acceleration.

BRIEF SUMMARY OF THE INVENTION

The present invention provides a new and improved mechanism for retracting a vehicle seat belt and locking the belt against extension. A belt carriage is mounted on the track for movement in the belt extending and retracting directions. A return spring biases the carriage in the belt retracting direction. The belt carriage has a locking edge engageable with a locking edge on the track to lock the belt carriage against belt extending movement when the carriage is pivoted bodily relative the track. A spring mounted on the carriage slidably bears upon the track to urge the carriage to a normal position wherein the locking edge is spaced from engagement with the track. The seat belt is attached to the carriage by a yoke which bodily pivots the carriage to engage the locking edge with the track upon attempted rapid extension of the belt.

One object, feature and advantage of the present invention resides in the provision of a linear locking retractor wherein the locking mechanisms associated with a belt carriage movable along a track is provided by bodily pivoting movement of the belt carriage to obtain locking interengagement of locking edges provided on the carriage and the track.

Another object, feature and advantage of the present invention resides in the provision of a linear locking retractor wherein the belt is attached to the belt carriage in a manner adapted to induce bodily pivoting movement of the belt carriage to obtain engagement between locking edges provided on the carriage and the track.

BRIEF SUMMARY OF THE DRAWINGS

These and other objects, features and advantages of the invention will become apparent upon consideration of the appended specification and the appended drawings in which:

Referring to FIG. 1, there is shown a vehicle body generally indicated at 10 having a conventional vehicle seat 12 mounted therein. The vehicle body 10 includes a door opening 14 which is selectively opened and closed by a door 16 having its forward end pivoted to the vehicle body for movment between the open position shown in FIG. 1 and a closed position.

Figure 1:
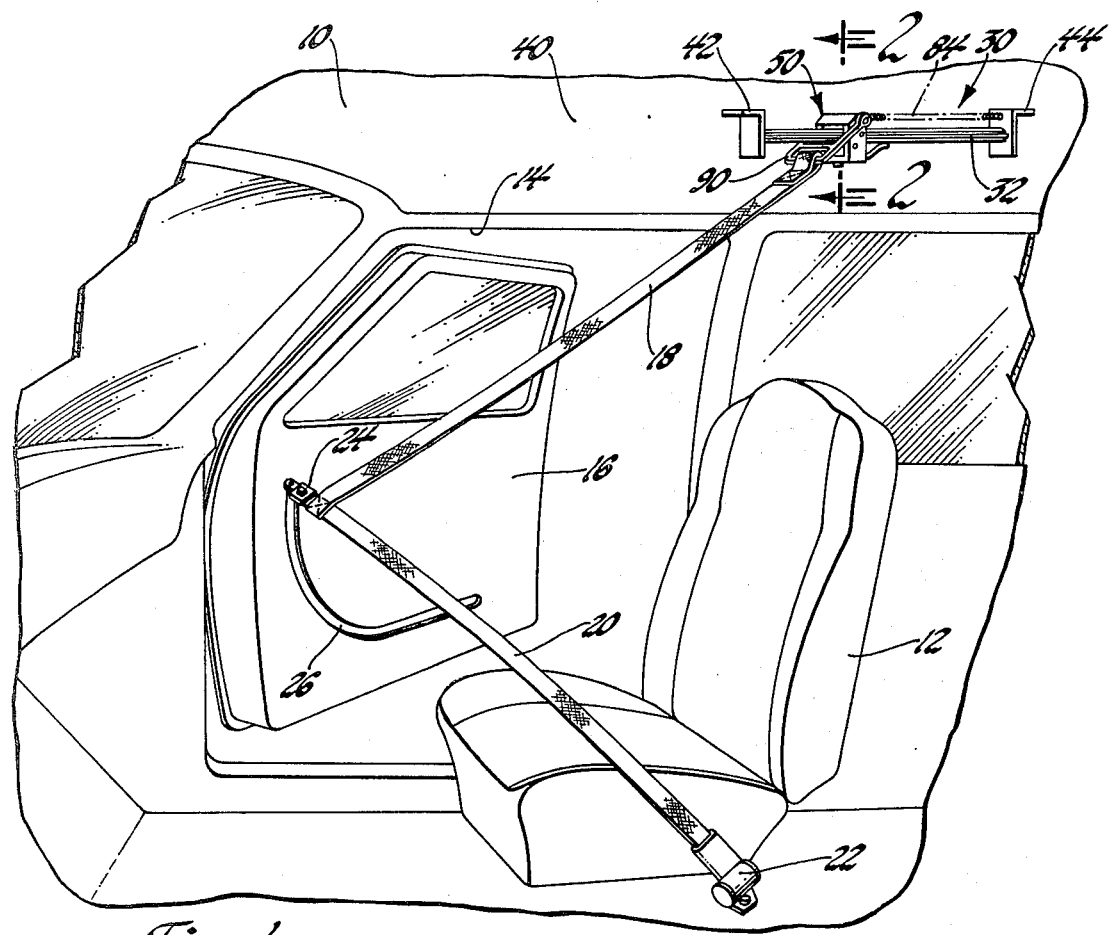
FIG. 1 is a perspective view of the vehicle body having a passive seat belt system employing a linear locking retractor according to the invention.

An occupant restraining belt system is provided in the vehicle body 10 to restrain an occupant in the vehicle seat 12. The restraint system includes a shoulder belt 18 and a lap belt 20. The inboard end of lap belt 20 is attached to the vehicle floor adjacent the inboard side of the seat by a conventional seat belt retractor 22. The retractor 22 has a reel which is spring biased to wind the lap belt 20 thereon and has an associated locking mechanism for selectively locking the reel against rotation in belt unwinding direction. The locking mechanism of the retractor 22 may be locked in response to deceleration of the vehicle or by rapid unwinding of the belt.

The outboard end of belt 20 is connected to an emergency release buckle 24 which is in turn attached to the door by a suitable mechanism which traverses a track 26 in the door panel to move the outboard end of the lap belt 20 between the FIG. 1 door-open position disposing the lap belt 20 forwardly of the occupant to facilitate ingress and egress and a rearward door-closed position in which the belt is positioned across the lap of the occupant. Reference may be had to U.S. Pat. No. 3,770,078, issued Nov. 6, 1973 to Keppel et al and assigned to the assignee of this invention for disclosure of a suitable mechanism for moving the buckle 24 and outboard lap belt end along the track 26.

The outboard end of shoulder belt 18 is sewn to the outboard end of lap belt 20 adjacent the emergency release buckle 24. The inboard end of shoulder belt 18 is attached to the vehicle roof at a location inboard and above the seated occupant by a linear locking retractor mechanism 30 of this invention.

Figure 2:
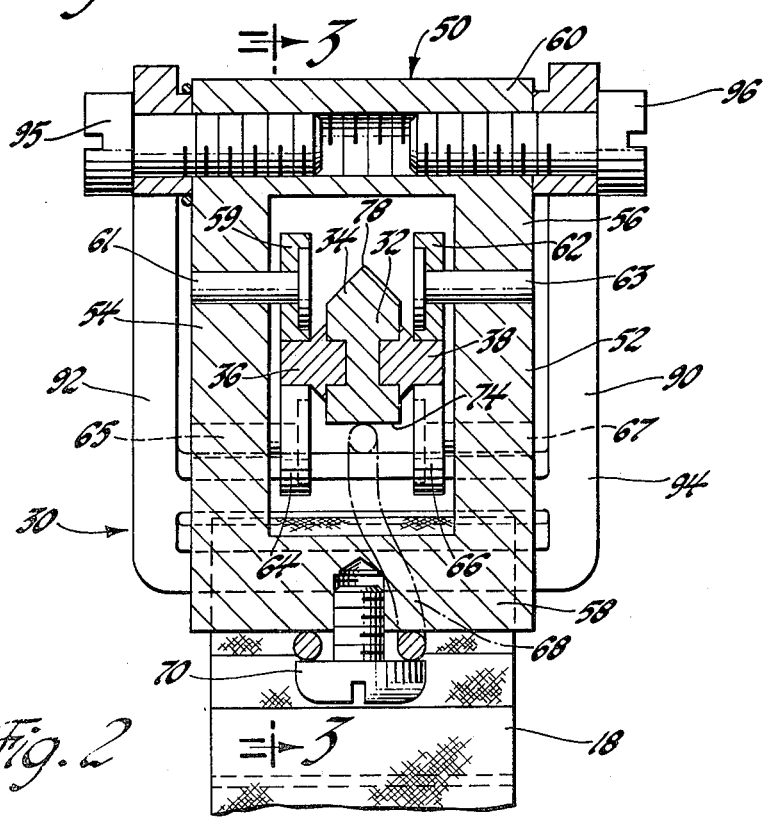
FIG. 2 is a sectional view taken in the direction of arrows 2—3 of FIG. 1.
Figure 3:
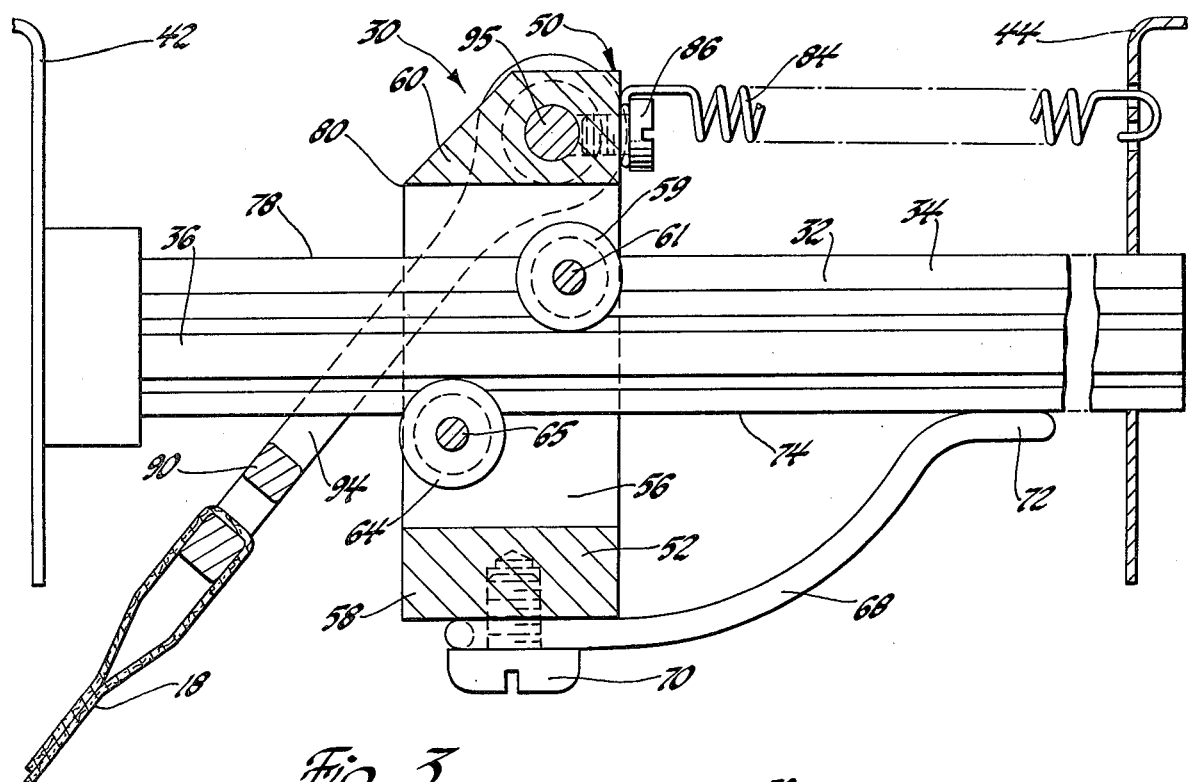
FIG. 3 is a sectional view taken in the direction of arrows 3—3 of FIG. 2.

The linear locking retractor 30, FIGS. 2 and 3, includes a track 32 provided by the assembly of a knife edge locking member 34 with a pair of lateral guide tracks 36 and 38. The ends of the track 32 are suitably bolted to the roof structure 40 by a front bracket 42 and a rear bracket 44.

Referring again to FIGS. 2 and 3, it is seen that a belt carriage, generally indicated at 50, is mounted for movement along the track 32. The belt carriage includes an annular rectangular frame 52 having laterally spaced side legs 54 and 56, a lower leg 58 and an upper leg 60 which surround the track 32. A pair of rollers 59 and 62 are rotatably attached to the laterally spaced legs 54 and 56 above the lateral guide tracks 36 and 38 by a pair of axle shafts 61 and 63. A second pair of rollers 64 and 66 are rotatably attached to the laterally spaced legs 54 and 56 below the lateral guide tracks 36 and 38 by a pair of axle shafts 65 and 67. As best seen in FIG. 3, the lower rollers 64 and 66 are located forwardly of the upper rollers 59 and 62. A leaf spring 68, best shown in FIG. 3, is attached to the lower leg 58 of the carriage frame 52 by a screw 70 and has a free end 72 which slidably bears on the lower face 74 of the knife edge locking member 34 of the track 32. The leaf spring 68 urges bodily pivoting motion of the carriage frame 52 in the clockwise direction as viewed in FIG. 3 so that the upper rollers 59 and 62 and the lower rollers 64 and 66 are maintained in rolling contact with the lateral guide tracks 36 and 38 to support the carriage frame 52 for fore and aft rolling movement along the track 32.

Referring again to FIGS. 2 and 3, it is seen that the knife edge locking member 34 of the track 32 is bevelled at its upper face to provide a knife edge 78 which extends the length of the track 32. Referring to FIG. 3, it is seen that the carriage upper leg 60 is bevelled to provide a knife edge locking portion 80 which is normally poised above the knife edge 78 so that the carriage 50 is free to move fore and aft along the track 32.

Referring to FIGS. 1 and 3, it is seen that the belt carriage 50 is urged in the rearward direction by a coil spring 84 having its one end attached to the carriage 50 by a screw 86 and its other end suitably connected to the rear mounting bracket 44. The carriage 50 could also be pulled rearwardly by a cable attached to the carriage and wound upon a spring biased reel as shown in U.S. Pat. No. 3,557,914, issued Jan. 26, 1971 to Tanaka and assigned to the assignee of this invention.

Referring to FIGS. 2 and 3, it is seen that the shoulder belt 18 is attached to the carriage frame 52 by a yoke 90 having laterally spaced arms 92 and 94 which are juxtaposed with the laterally spaced walls 54 and 56 of the carriage frame 52 and attached thereto by bolts 95 and 96.

Figure 4:
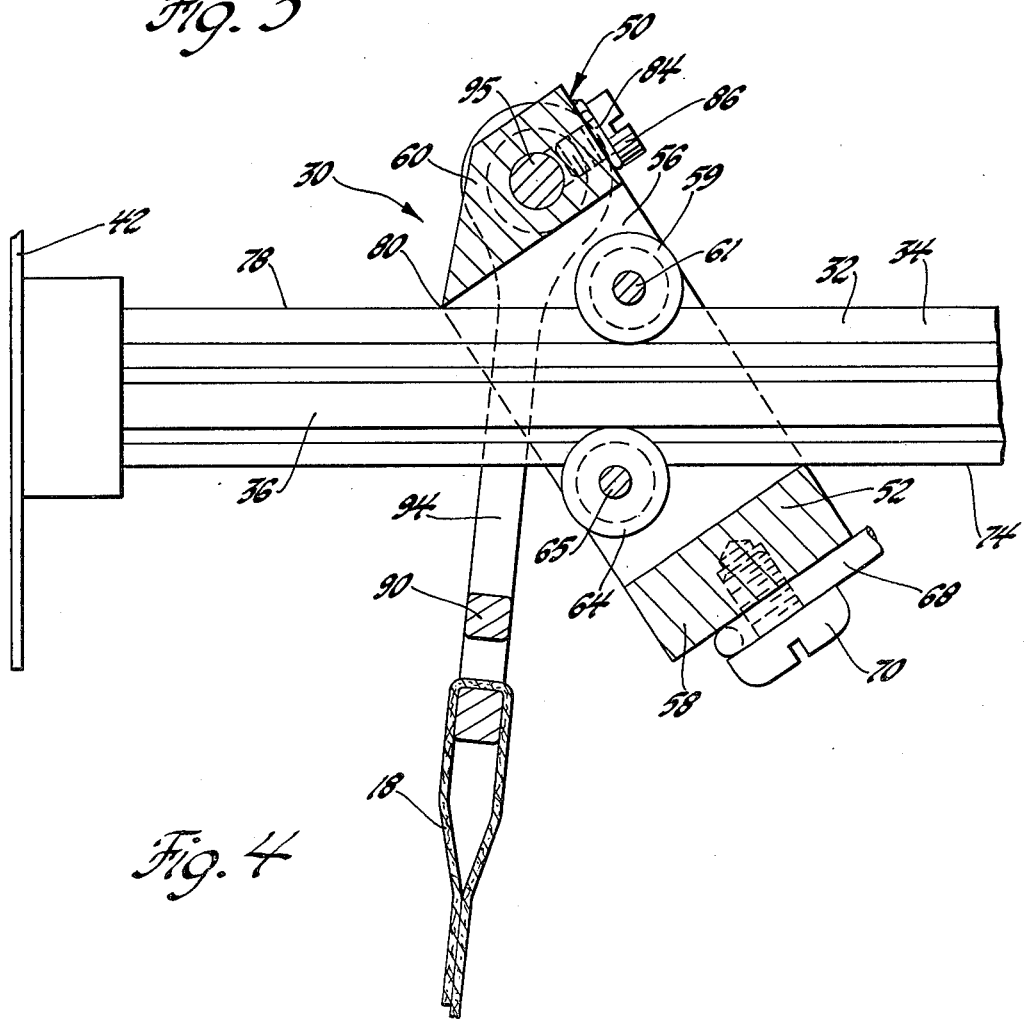
FIG. 4 is a view similar to FIG. 3 but showing the linear locking retractor in the locked position to prevent belt extension.

Referring to FIGS. 3 and 4, it will be understood that bodily pivoting movement of the carriage frame 52 to the position of FIG. 4 by an occupant restraining load imposed upon the shoulder belt 18 pivots the locking frame bodily in the counterclockwise direction against the effort of leaf spring 68 to carry the knife edge locking portion 80 into locking engagement with the knife edge 78 of the track 32.

OPERATION

Referring again to FIG. 1, it will be understood that the opening movement of the door 16 moves the emergency release buckle 24 forward along the track 26 which in turn unwinds the lap belt 20 from the retractor 22 and extends the shoulder belt 18 by forward movement of the carriage 50 along the track 32. During such forward movement of the carriage 50, the leaf spring 68 maintains the carriage in its vertical normal position of FIG. 3 wherein the carriage knife edge locking portion 80 is poised above track knife edge 78.

When the occupant leans forwardly, the carriage 50 moves forwardly while maintaining the vertical orientation of FIG. 3 so that the belt may be extended from the linear locking retractor 30.

When the vehicle experiences a rapid deceleration, the lap belt restraint of the occupant lower torso induces forward pivotal movement of the upper torso causing abrupt forward extension of the belt 18. The abrupt forward extension of the belt 18 imposes a counterclockwise force moment upon the carriage 50 which overcomes the stabilizing affect of leaf spring 68 allowing bodily pivotal movement of the carriage frame 52 to the position of FIG. 4 wherein the knife edge locking portion 80 of the carriage 50 engages the knife edge 78 of the track 32 to lock the carriage against further forward belt extending movement. The carriage lower leg 58 engages the lower reaction face 74 of the track knife edge member 34 as seen in FIG. 4 so that the load is not imposed upon the rollers 59, 62, 64 or 66 or upon the lateral guide tracks 36 and 38. It will be understood that the configuration and the hardness of the knife edges 78 and 80 must be appropriately selected to provide effective locking interengagement and yet not be susceptible to excessive wear or galling.

Although the linear locking retractor shown herein has the belt attached directly to the carriage 50, the belt may traverse one or more pulleys as shown in U.S. Pat. No. 3,557,914, issued Jan. 26, 1971 to Tanaka and assigned to the assignee of this invention. The use of one or more pulleys provides a retractor in which a considerable length of belt may be stored and is particularly desirable when the retractor of this invention is to be employed in the prior art active type belt systems where the purpose of the retractor is to store a considerable length of belt.

Thus, it is seen that the invention provides a new and improved linear locking seat belt retractor wherein the lock associated with a belt carriage movable along a track is provided by bodily pivoting movement of the belt carriage to obtain engagement of locking edges provided on the carriage and the track.

The embodiments of the invention in which an exclusive property or privilege is claimed are defined as follows:

1. A seat belt locking and retracting mechanism comprising:
 a longitudinally extending track having oppositely facing knife edge and reaction face portions and a guide track portion;
 a belt carriage having roller means engaging the guide track portion to mount the carriage on the track for longitudinal movement therealong and being bodily pivotable relative the track, said carriage having a knife locking edge and a leg respectively engageable with the track knife edge and the track reaction face upon bodily pivoting movement of the carriage to lock the carriage against movement along the track in the belt extending direction; and
 a return spring acting on the belt carriage to urge the belt carriage in a belt retracting direction;
 a spring means associated with the carriage and slidably bearing upon the track to urge the carriage to a normal position wherein the carriage knife locking edge and leg are spaced from engagement with the track knife edge and reaction face to permit movement of the carriage along the track; and
 means attaching the seat belt to the carriage in a manner to effect bodily pivoting movement of the carriage to engage the locking edge with the track upon attempted rapid extension of the belt.

2. A seat belt locking and retracting mechanism comprising:
 longitudinally extending track having a locking portion, a reaction face, and a guide track portion;
 a belt carriage having engaging means thereon engageable with the guide track portion to mount the belt carriage for longitudinal movement along the track, said engaging means being disengageable from the guide track portion upon bodily pivotal movement of the belt carriage relative the track;
 a locking means and a reaction leg on the belt carriage respectively spaced from the locking portion and the reaction face of the track and being engageable therewith upon bodily pivoting of the belt carriage to lock the carriage against movement along the track in at least the belt extending direction;
 a return spring acting on the belt carriage to urge the belt carriage in the belt retracting direction;
 spring means acting between the carrage and the track to urge the carriage to the normal position wherein the locking means and reaction leg of the carriage are spaced from the locking portion and reaction face of the track; and
 means attaching the seat belt to the carriage in a manner to effect bodily pivoting movement of the carriage upon attempted rapid extension of the belt.

* * * * *